US012762820B2

(12) United States Patent
Han et al.

(10) Patent No.: US 12,762,820 B2
(45) Date of Patent: Oct. 13, 2026

(54) REGION RECOGNITION METHOD AND REGION RECOGNITION DEVICE

(71) Applicant: Lenovo (Beijing) Limited, Beijing (CN)

(72) Inventors: Zhongtao Han, Beijing (CN); Peng Chen, Beijing (CN); Peifa Yan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 317 days.

(21) Appl. No.: 18/461,113

(22) Filed: Sep. 5, 2023

(65) Prior Publication Data

US 2024/0127569 A1 Apr. 18, 2024

(30) Foreign Application Priority Data

Sep. 30, 2022 (CN) ......................... 202211230637.0

(51) Int. Cl.

| | |
|---|---|
| ***G06V 10/25*** | (2022.01) |
| ***G06T 7/13*** | (2017.01) |
| ***G06T 7/70*** | (2017.01) |
| ***G06V 10/44*** | (2022.01) |
| ***G06V 10/46*** | (2022.01) |
| ***G06V 10/74*** | (2022.01) |
| ***G06V 20/10*** | (2022.01) |

(52) U.S. Cl.

CPC ................ *G06V 10/25* (2022.01); *G06T 7/13* (2017.01); *G06T 7/70* (2017.01); *G06V 10/44* (2022.01); *G06V 10/46* (2022.01); *G06V 10/761* (2022.01); *G06V 2201/07* (2022.01)

(58) Field of Classification Search

None

See application file for complete search history.

(56) References Cited

U.S. PATENT DOCUMENTS

2007/0038421 A1* 2/2007 Hu .......................... G06T 13/60 703/6

2015/0078640 A1* 3/2015 Guo .......................... G06T 7/12 382/131

FOREIGN PATENT DOCUMENTS

CN 110569704 A * 12/2019 ............ G06F 18/25

JP 2000009820 A * 1/2000

WO WO-2022006591 A1 * 1/2022 ........... G06Q 10/047

OTHER PUBLICATIONS

Abdel-Aziz, H. S., Zanaty, E. A., Ali, H. A., & Saad, M. K. (2021). Generating Bézier curves for medical image reconstruction. Results in Physics, 23, Article 103996. https://doi.org/10.1016/j.rinp.2021.103996 (Year: 2021).*

(Continued)

*Primary Examiner* — Amandeep Saini
*Assistant Examiner* — Caroline Tabancay Duffy
(74) *Attorney, Agent, or Firm* — ANOVA LAW GROUP, PLLC

(57) ABSTRACT

A region recognition method includes obtaining a scene image of a scene to-be-recognized; determining a specified boundary curve of the scene image; generating a contour map corresponding to the scene image according to the specified boundary curve; and determining a target region in the scene according to the contour map.

19 Claims, 5 Drawing Sheets

(56) References Cited

OTHER PUBLICATIONS

Knuth, Donald. Metafont: The Program. 1986. Addison-Wesley. Part 17, pp. 116-121. (Year: 1986).*

Misro, M. Y. Ramli, A. Ali, J. M. Quintic trigonometric Bezier curve and its maximum speed estimation on highway designs. Jun. 28, 2018. AIP Conference Proceedings. Proceedings of the 25th National Symposium on Mathematical Sciences 2017. https://doi.org/10.1063/1.5041620. (Year: 2018).*

* cited by examiner

REGION RECOGNITION METHOD AND REGION RECOGNITION DEVICE

CROSS-REFERENCE TO RELATED APPLICATION

This application claims priority to Chinese Patent Application No. 202211230637.0, filed on Sep. 30, 2022, the content of which is incorporated herein by reference in its entirety.

TECHNICAL FIELD

The present disclosure generally relates to the field of information processing technologies and, more particularly, to a region recognition method and a region recognition device.

BACKGROUND

As intelligent surveillance technology and image processing technology develop, it is possible to surveil a target object, for example, to determine a region where the target object is located. However, usually, only a rough region can be determined when determining the region where the target object is located. Therefore, the range of the region is not accurate, reducing the accuracy of surveillance.

SUMMARY

In accordance with the present disclosure, there is provided a region recognition method. The method region recognition includes: obtaining a scene image of a scene to-be-recognized; determining a specified boundary curve of the scene image; generating a contour map corresponding to the scene image according to the specified boundary curve; and determining a target region in the scene according to the contour map.

In accordance with the present disclosure, there is also provided an electronic device. The electronic device includes one or more processors; and a memory coupled to the one or more processors and storing computer program instructions that, when being executed, cause the one or more processors to perform: obtaining a scene image of a scene to-be-recognized; determining a specified boundary curve of the scene image; generating a contour map corresponding to the scene image according to the specified boundary curve; and determining a target region in the scene according to the contour map.

In accordance with the present disclosure, there is also provided a non-transitory computer readable storage medium containing computer program instructions that, when being executed, cause one or more processors to perform: obtaining a scene image of a scene to-be-recognized; determining a specified boundary curve of the scene image; generating a contour map corresponding to the scene image according to the specified boundary curve; and determining a target region in the scene according to the contour map.

BRIEF DESCRIPTION OF THE DRAWINGS

The following drawings are merely examples for illustrative purposes according to various disclosed embodiments and are not intended to limit the scope of the present disclosure. In the drawings, same or similar reference numerals/characters refer to the same or corresponding parts.

DETAILED DESCRIPTION OF THE EMBODIMENTS

Hereinafter, embodiments and features consistent with the present disclosure will be described with reference to drawings.

Various modifications may be made to the embodiments of the present disclosure. Thus, the described embodiments should not be regarded as limiting, but are merely examples. Those skilled in the art will envision other modifications within the scope and spirit of the present disclosure.

The accompanying drawings, which are incorporated in and constitute a part of this specification, illustrate embodiments of the present disclosure and, together with the general description of the present disclosure above and the detailed description of the embodiments below, serve to explain the principle of the present disclosure.

These and other features of the present disclosure will become apparent from the following description of non-limiting embodiments with reference to the accompanying drawings.

Although the present disclosure is described with reference to some specific examples, those skilled in the art will be able to realize many other equivalents of the present disclosure.

The above and other aspects, features, and advantages of the present disclosure will become more apparent in view of the following detailed description when taken in conjunction with the accompanying drawings.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure.

In the present disclosure, the phrases such as “in one embodiment”, “in another embodiment”, “in yet another embodiment”, or “in other embodiments”, may all refer to one or more of different embodiments in accordance with the present disclosure.

The present disclosure provides a region recognition method. The region recognition method may be applied in traffic security, region detection, abnormal intrusion detection, or other fields. The method may be able to determine a region where a target object enters, or determine a specified region. Specifically, the region recognition method may be executed by a data processing device connected to an image acquisition device, to accurately determine a target region in a scene to-be-recognized.

Figure 1:
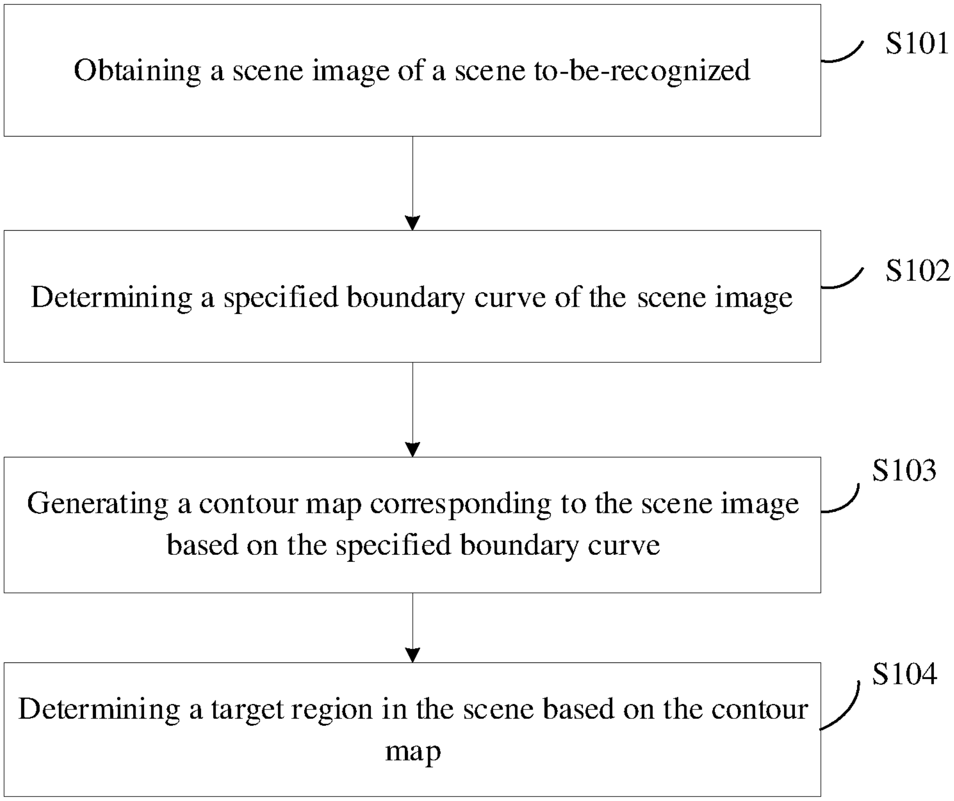
FIG. 1 is a flow chart of an example region recognition method consistent with the present disclosure.

In one embodiment, as shown in FIG. 1 illustrating a flow chart of a region recognition method, the method may include S101 to S104.

In S101, a scene image of a scene to-be-recognized may be obtained.

The scene to-be-recognized may be an application scene of the region recognition method, such as a surveillant scene, an intrusion detection scene, and the like. The scene image of the scene to-be-recognized may be collected by an image acquisition device, and a collection range of the scene image may match actual collection requirements. For example, the scene image may be a panoramic image of the scene to-be-recognized, or an image of a partial region of the current scene. The acquisition format of the scene image may match an actual image acquisition device. For example, when the image acquisition device is an ordinary camera device, the scene image may be a two-dimensional image; when the image acquisition device is a video capture device, the scene image may be an image corresponding to a certain frame or a current frame in the video; and when the image acquisition device is a 3D camera, the scene image may be a depth image.

In S102, a specified boundary curve of the scene image may be determined.

In S103, according to the specified boundary curve, a contour map corresponding to the scene image may be generated.

Figure 2:
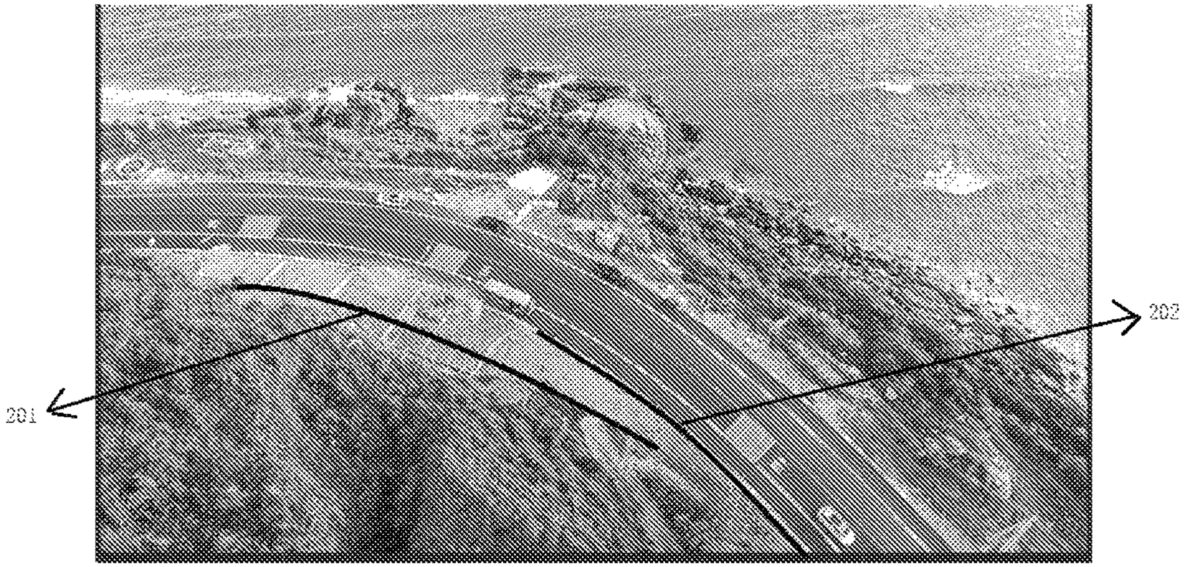
FIG. 2 is a schematic diagram of a scene consistent with the present disclosure.

In one embodiment shown in FIG. 2 which is a schematic diagram of the scene image, the scene image may include regions composed of different image features, such as seawater regions, road regions, vegetation regions, or open space regions. When determining the specified boundary curve of the scene image, the specified boundary curve may be a boundary curve selected by a target operand in the scene image, that is, the specified boundary curve may be only related to a curve or points selected by the target operand. The specified boundary curve may also be a boundary curve of different regions automatically identified according to the scene image. As shown in FIG. 2, 201 may be the specified boundary curve selected by the target operant. In FIG. 2, the boundary curve is not the same as the actual vegetation boundary in the scene image, but is the boundary curve selected by the target operant according to actual needs. In FIG. 2, 202 is the boundary curve of the road automatically recognized according to the scene image.

In the present disclosure, the region recognition may be performed according to the specified boundary curve, which solves the problem of that recognition can only be performed on regions composed of straight lines. Therefore, the region recognition method may apply to more application scenes, improving the universal applicability of the region recognition method.

In one embodiment, determining the specified boundary curve of the scene image may include: generating the specified boundary curve matching the scene image according to obtained specified contour points.

The specified contour points may be contour points selected by the target operand on the scene image. The pixel coordinate information of the specified contour points in the scene image, a preset curve width, a curve shape, or other information may be obtained. Then, each specified contour point may be sorted according to the order in which the curve is drawn. According to the sorting order, the corresponding pixel coordinate information and curve width, drawing may be performed to obtain several line segments, and then assembly and smoothing may be performed on the several line segments according to the shape of the curve to obtain the specified boundary curve. In another embodiment, key points may be selected from the specified contour points. The key points may include a starting point, an inflection point, an end point, or a control point. The key points may also include a corner point, a tangent point, etc. After obtaining the key points, curve fitting may be performed according to the coordinate information of the key points to obtain the specified boundary curve. The curve fitting method may include a circular curve fitting method, a Bezier curve fitting method, and the like.

To assist the target operant in determining the specified boundary curve more accurately and conveniently, corresponding prompt information or auxiliary information may be generated according to feature information of the scene image to assist the operation of the target operant.

In one embodiment, determining the specified boundary curve of the scene image may include: performing feature recognition on the scene image to obtain image features; according to the image features, determining the region to-be-recognized; and determining the specified boundary curve of the region to-be-recognized. The feature recognition may include recognition of information such as pixel features, boundary features, or color features in the scene image, such that the corresponding image features may be obtained. For example, in one embodiment, the image features may be the gray values of pixels, and region division may be performed on the scene image according to the gray values of pixels to obtain the region to-be-recognized, where the region to-be-recognized may be a region whose pixel gray values are within a preset range. In another embodiment, the image features may be color values (such as RGB values), and region division may be performed on the scene image according to the color values of pixels to obtain the region to-be-recognized, where the region to-be-recognized may be a region whose color values are within a preset color threshold range. After obtaining the region to-be-recognized, the target operant may determine the specified boundary curve in the corresponding region to-be-recognized according to the actual application requirements. For example, the region to-be-recognized may include a tree region, an open space region, or a house region. When the recognition requirement is to determine the target region in the open space region, the target operant may determine the specified boundary curve of the open region.

After the specified boundary curve is obtained, a contour map corresponding to the scene image may be generated according to the specified boundary curve. In one embodiment, height values of the pixel points may be determined by obtaining the pixel coordinate information of each pixel point on the specified boundary curve, and then a plurality of contour lines may be generated according to the height values. Subsequently, the contour map may be obtained by rendering according to the plurality of generated contour lines.

In one embodiment, generating the contour map corresponding to the scene image according to the specified boundary curve may include: obtaining pixel coordinate information of discrete points on the specified boundary curve; obtaining the plurality of contour lines by calculation according to target contour weight and the pixel coordinate information of each discrete point; and rendering the regions corresponding to the plurality of contour lines to obtain the contour map.

The target contour weight may represent coordinate difference information between the plurality of contour lines, mainly including the height difference between the plurality of contour lines. To facilitate the acquisition of relevant curve parameters on the specified boundary curve, the entire specified boundary curve may be discretized through the Bezier curve algorithm to obtain the discrete points, and then the plurality of contour lines may be obtained according to the pixel coordinate information of the discrete points. The pixel coordinate information of the discrete points may include positions or true heights of the discrete points. In practical applications, one discrete point may correspond to an actual geographic location. The geographic location may correspond to an actual longitude value and a latitude value, or may correspond to a longitudinal coordinate and a vertical coordinate in the scene image. In one embodiment, the target contour weight may be automatically determined according to the image features in the scene image or may be a value specified by the target operant. For example, the height difference between two contour lines specified by the target operant may be 50 m. After obtaining the plurality of contour lines, rendering may be performed according to the corresponding regions between different contour lines, for example, rendering may be performed according to different colors or fill formats, to obtain the contour map.

In one embodiment, the target contour weight may be determined according to the scene characteristics of the scene to-be-recognized. That is, the target contour weight may be determined according to height characteristics or layout characteristics of buildings, plants or other background objects existing in the scene to-be-recognized. For example, when the scene features indicate that the scene is relatively open and the height difference between buildings is obvious, the value of the target contour weight may be set larger.

In one embodiment, obtaining the pixel coordinate information of the discrete points on the specified boundary curve may include: according to the pixel coordinate information of the specified contour points on the specified boundary curve, performing discretization on the specified boundary curve to determine the discrete points; and obtaining the pixel coordinate information of the discrete points.

In one embodiment, obtaining the plurality of contour lines according to the target contour weight and the pixel coordinate information of each discrete point by calculation may include: obtaining curve parameters of the specified boundary curve according to the pixel coordinate information of the discrete points; and obtaining the plurality of contour lines according to the target contour weight and the curve parameters by calculation.

The specified boundary curve may be represented by a Bezier curve. The expression of the Bezier curve is:

$$P(t)=\sum_{i=0}^{n}P_iB_{i,n}(t),\ t\in[0,1]$$

$$B_{i,n}(t)=C_n^i t^i(1-t)^{n-i}=\frac{n!}{i!(n-i)!}t^i(1-t)^{n-i},$$

where i=0, 1, . . . , n. $P_i$ represents the specified contour points selected on the specified boundary curve. For example, in one embodiment, four points may be selected, such that $P_0$ is the starting point, $P_1$ and $P_2$ are the control points, and $P_3$ is the end point. $B_{i,n}(t)$ is the coordinate of $P_i$ under t step size. The specified boundary curve may be discretized through the selected specified contour points. For example, in one embodiment, the discrete points satisfying the conditions among the known four control points may be calculated, and the pixel coordinate information of each discrete point may be obtained. For example, the starting point $P_0$ and the terminal point $P_3$ may be determined, and then two intermediate points separated from each other may be confirmed at a fixed tangent angle, such as $P_1$ and $P_2$. Then, through the Bezier curve algorithm, the pixel coordinate information of the discrete points satisfying the condition may be generated through multiple cycles of calculations. For example, the discretization method may be realized by setting the step size of t in the above formula.

After obtaining the pixel coordinate information of each discrete point, the curve parameters of the specified boundary curve may be obtained. The curve parameters may include the curvature of the curve, or the tangent vector and the normal vector of each discrete point on the curve. That is, according to the discrete points, the tangent line and normal line of each discrete point on the specified boundary curve may be obtained. After the normal line of each discrete point is calculated, the contour line corresponding to the discrete points may be obtained.

Figure 3:
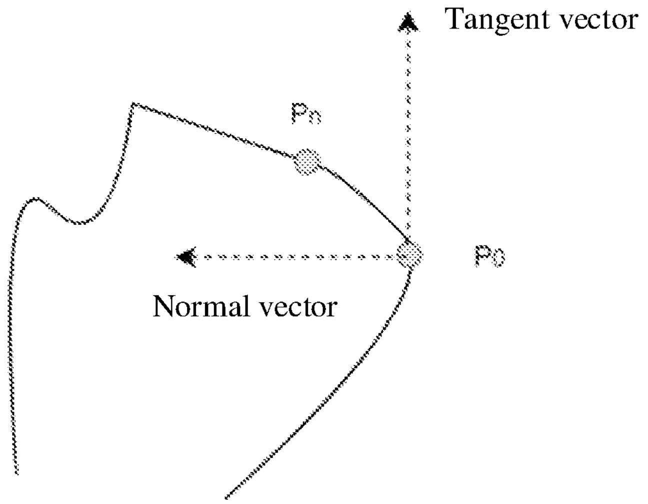
FIG. 3 is a schematic diagram of a tangent vector and a normal vector consistent with the present disclosure.

In one embodiment as shown in FIG. 3 which is a schematic diagram of a tangent vector and a normal vector, a tangent vector at a point of the curve may be a vector along the tangent direction at the point of the curve, and a vector represented by a straight line perpendicular to the plane may be the normal vector of the plane. That is, the normal line of the three-dimensional plane is a three-dimensional vector perpendicular to the plane, and the normal line of the curved surface at the point $P_0$ may be a vector perpendicular to the tangent plane of the point $P_0$.

Figure 4:
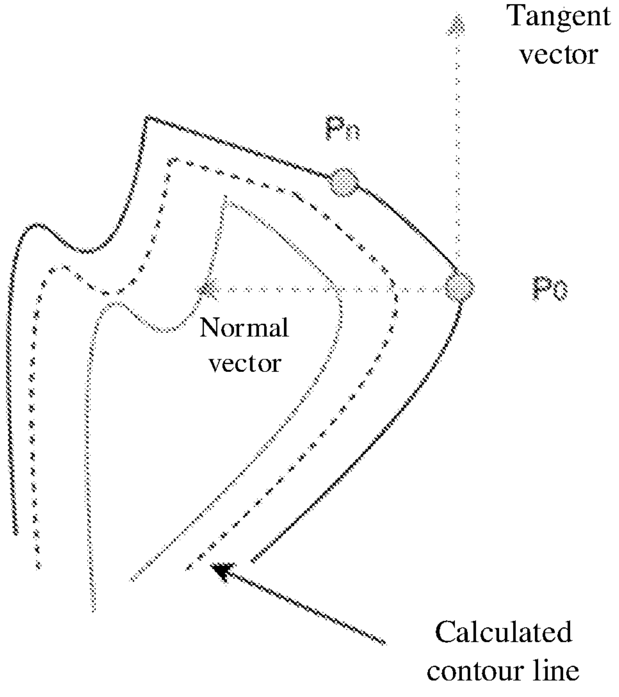
FIG. 4 is a schematic diagram of a scene for calculating contour lines consistent with the present disclosure.

In one embodiment shown in FIG. 4 which is a schematic diagram of a scene where the plurality of contour lines is calculated, since the normal vector is a three-dimensional vector perpendicular to the plane, the height of each point on the curve relative to the horizontal plane may be determined through the normal vector of each discrete point, such that the plurality of contour lines may be calculated according to the height values.

After the plurality of contour lines is determined, rendering may be performed to obtain the contour map, which is also called a contour surface map. In one embodiment, rendering the regions corresponding to the plurality of contour lines to obtain the contour map may include: determining a rendering mode corresponding to the target contour weight; and rendering a region corresponding to each contour line to obtain the contour map according to the height values of each of the plurality of contour lines and the rendering mode.

The target contour weight may represent the coordinate difference information between the plurality of contour lines, and a region corresponding to one of the plurality of contour lines may be regions between corresponding two contour lines, such as a region between a contour line with a representation height of 10 m and a contour line with a representation height of 20 m. The corresponding rendering mode may be determined according to the target contour line weight. When the target contour line weight is large, the rendering mode may include selecting different colors for different regions to render. When the target contour line weight is small and the corresponding color is selected for rendering, colors with a large difference in chromaticity may be selected for rendering, such that the contour map obtained after rendering may be able to more clearly represent the information of different contour regions. For example, in one embodiment, when performing rendering, regions corresponding to different contour lines may correspond to different rendering modes, such as using different colors or different graphics for rendering.

In another embodiment, the process of generating the contour map may be a visual operation process. That is, the relevant information may be changed and adjusted according to the selection, input, or adjustment information by the target operant. For example, the target contour line weight or the specified boundary curve may be adjusted. Thereby, the convenience and experience effect of the user's operation may be improved. For example, in one embodiment, in response to the received adjustment information for the target contour weight of the contour map, the adjusted contour weight may be obtained; and then the contour map may be re-rendered to obtain an adjusted contour map according to the rendering mode corresponding to the adjusted contour weight. The adjustment information may be a value corresponding to the contour line weight re-input by the target operant or may be a drag operation by the target operant on the plurality of contour lines in the current contour map and the adjusted contour weight may be determined according to the dragging range. When the contour weight changes, the corresponding rendering mode may automatically match the change to re-render the regions corresponding to the plurality contour lines, and the adjusted contour map may be obtained.

In S104, a target region in the scene to-be-recognized may be determined according to the contour map.

After the contour map is obtained, the contour map may be used to determine the target region in the scene to-be-recognized. The target region may be a region with specified characteristics, such as a region that meets the surveillant conditions. For example, in one embodiment, when monitoring the growth of crops, the crops with high growth heights may be surveilled according to the contour map, to determine the region where the crops with high growth heights are located as the target region.

In the surveillant scene, according to the contour map, the region corresponding to the position of the target object in the scene to-be-recognized may also be determined as the target region.

In one embodiment, determining the target region in the scene to-be-recognized according to the contour map may include: obtaining specified position information of a recognition frame corresponding to an object to be recognized; and determining the target region where the object to be recognized is located in the scene to-be-recognized according to the pixel coordinate information of the specified position information in the contour map.

The object to be recognized may be a surveillant person, an unmanned aerial vehicle, or another object. To determine the position of the object to be recognized more accurately, the position of the object to be recognized may be determined by setting the corresponding recognition frame. The recognition frame may be in a shape such as a rectangle or a circle. The specified position information of the recognition frame may include the position information of each vertex of the recognition frame, or the position information of the center point of the recognition frame. In one embodiment, the position information may be coordinate information in the target reference coordinate system. According to the pixel coordinate information of the specified position information on the contour map, the target region of the object to be recognized in the scene to-be-recognized may be determined. According to the pixel coordinate information of the specified position information on the contour map, the height range of the corresponding region may be determined, and then the region composed of objects with heights within the height range may be obtained as the target region according to the height range.

In one embodiment, the method may further include: in response to a target object located in the target region, distance information between the target object and a reference object in the target region may be determined according to the contour map.

According to the distance information, warning information indicating that the target object invades the target region may be generated.

When it is detected that the target object enters the target region, the distance information between the target object and the corresponding reference object may also be determined according to the contour map, to further determine the exact position of the target object. According to the height information and position information corresponding to the reference object, the coordinate information of the reference object on the contour map may be determined, and then the distance information between the target object and the reference object may be obtained by calculation according to the coordinate information of the target object on the contour map. The warning information may include different levels of information. When the distance value corresponding to the distance information between the target object and the reference object is less than a preset distance threshold, a higher level of warning information may be generated to remind relevant personnel that the target object enters the dangerous or surveillant regions, etc.

Figure 5:
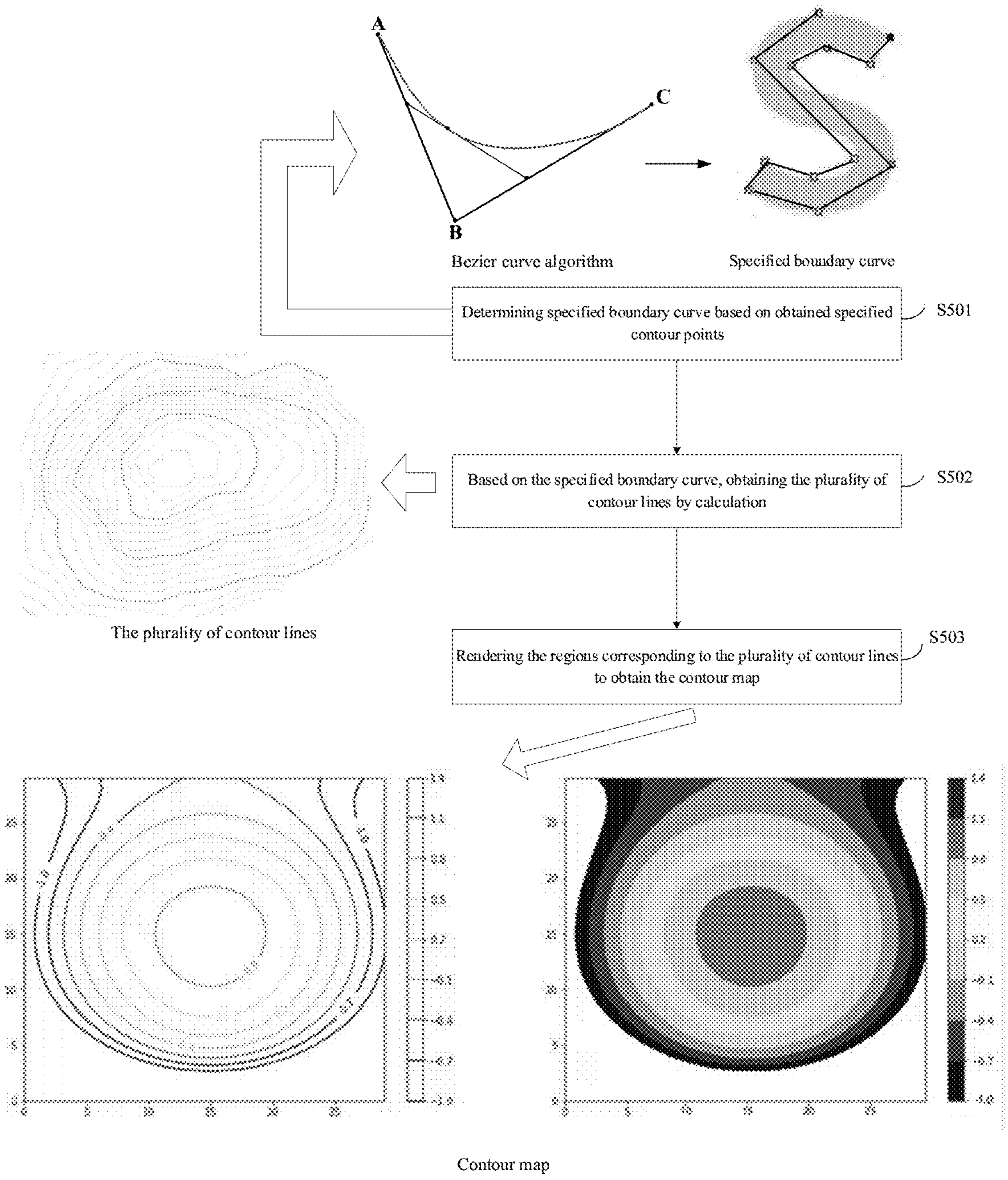
FIG. 5 is a schematic diagram of an application scene of target region detection consistent with the present disclosure.

As shown in FIG. 5, an application scene of the target region detection will be used as an example to illustrate the present disclosure below. As shown in FIG. 5, the process may include S501 to S503.

In S501, a specified boundary curve may be determined according to the obtained specified contour points.

According to the Bezier curve algorithm, the specified contour points may be determined as the control points of the Bezier curve, and then the shape of the corresponding region may be determined through the control points, to obtain the specified boundary curve.

In S502, according to the specified boundary curve, a plurality of contour lines may be obtained by calculation.

According to the Bezier curve formula, the entire specified boundary curve may be discretized to obtain a plurality of discrete points, and the tangent line and normal line of a curve where each discrete point is located may be obtained. After calculating the normal line of each point, a contour line corresponding to each point on the curve may be obtained, and further the plurality of contour lines of the specified boundary curve may be calculated.

In S503, the regions corresponding to the plurality of contour lines may be rendered to obtain the contour map.

For example, the plurality of contour lines may be rendered to form a region template map marked with target contour weight as the contour map. Therefore, the recognition of the target region, the detection of the target object, or the monitoring of corresponding information may be performed according to the contour map.

In the region recognition method provided by various embodiments of the present disclosure, the target region may be determined according to the specified boundary curve, and the regions composed of simple straight lines may be extended to the region composed of curves, such that the usage requirements of more application scenes may be supported. Further, subdivision may be performed according to the regional function of the curve to meet the application requirements of different regions. Also, the relevant distance information may be determined to meet the needs of more scenes and users. In addition, the contour weight of the region between two contour lines may be configured through visual operation. Therefore, the adjustment may be performed more conveniently according to real-time scenes, and more accurate warning information may be achieved in the application scene of surveillance and warning. And the rendering may be performed according to the rendering mode corresponding to the contour weight, and the regions between different contour lines may be rendered into the contour map with difference, which improves the display effect.

Figure 6:
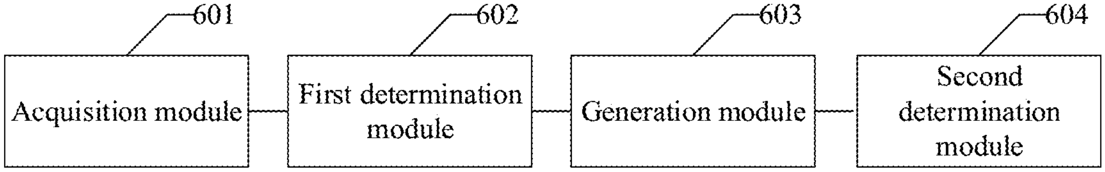
FIG. 6 is a structural diagram of a region recognition device consistent with the present disclosure.

The present disclosure also provides a region recognition device. As shown in FIG. 6, in one embodiment, the region recognition device may include an acquisition module 601 configured to acquire a scene image of a scene to-be-recognized, a first determination module 602 configured to determine a specified boundary curve of the scene image, a generation module 603 configured to generate a contour map corresponding to the scene image according to the specified boundary curve, and a second determination module 604 configured to determine a target region in the scene to-be-recognized according to the contour map.

In the region recognition device provided by the present disclosure, the acquisition module may be configured to acquire a scene image of a scene to-be-recognized, the first determination module may be configured to determine a specified boundary curve of the scene image, the generation module may be configured to generate a contour map corresponding to the scene image according to the specified boundary curve, and the second determination module may be configured to determine a target region in the scene to-be-recognized according to the contour map. The contour map corresponding to the specified boundary curve may be generated, and the target region may be accurately recognized according to the contour map, which improves the accuracy of region recognition.

In one embodiment, the generation module may include: a first acquisition sub-module, configured to obtain pixel coordinate information of discrete points on the specified boundary curve; a first calculation sub-module, configured to obtain a plurality of contour lines according to the target contour weight and the pixel coordinate information of each discrete point, where the target contour weight may represent the coordinate difference information between the plurality of contour lines; and a rendering sub-module, configured to render the regions corresponding to the plurality of contour lines to obtain the contour map.

In one embodiment, the device may further include a weight determination module, configured to determine the target contour weight according to scene features of the scene to-be-recognized.

In one embodiment, the first acquisition sub-module may be configured to: discretize the specified boundary curve to obtain the plurality of discrete points according to the pixel coordinate information of the specified contour points on the specified boundary curve; and obtain the pixel coordinate information corresponding to the plurality of discrete points.

The first calculation sub-module may be configured to: obtain the curve parameters of the specified boundary curve according to the pixel coordinate information of the plurality of discrete points; and obtain the plurality of contour lines according to the target contour weight and the curve parameters by calculation.

In one embodiment, the rendering sub-module may be configured to: determine a rendering mode corresponding to the target contour weight value; and perform rendering on a region corresponding to each contour line according to the height value of each contour line and the rendering mode to obtain the contour map.

In one embodiment, the device may further include: an adjustment module, configured to obtain an adjusted contour weight in response to received adjustment information for the target contour weight of the contour map; and a re-rendering module, configured to re-rendering the contour map according to a rendering mode corresponding to the adjusted contour weight to obtain an adjusted contour map.

In one embodiment, the first determination module may be configured to: generate the specified boundary curve matching the scene image according to the obtained specified contour points.

In one embodiment, the first determination module may be further configured to: perform feature recognition on the scene image to obtain image features; determine a region to-be-recognized according to the image features; and determine the specified boundary curve of the region to-be-recognized.

In one embodiment, the second determination module may be configured to: obtain specified position information of a recognition frame corresponding to the object to be recognized; determine a target region where the object to be recognized is located in the scene to-be-recognized according to pixel coordinate information of the specified position information on the contour map.

In one embodiment, the device may further include: a distance determination module, configured to determine a distance between the target object and a reference object in the target region according to the contour map in response to the target object being located in the target region; and a warning information generating module, configured to generate warning information indicating that the target object invades the target region according to the distance information.

The present disclosure also provides a readable storage medium, configured to store a computer program. When the computer program is executed by a processor, the region recognition method provided by various embodiments of the present disclosure may be achieved.

The present disclosure also provides an electronic device. The device may include:

- a memory, configured to store an application program or data generated when the application program is executed; and
- a processor, configured to execute the application program to: acquire a scene image of a scene to-be-recognized, determine a specified boundary curve of the scene image, generate a contour map corresponding to the scene image according to the specified boundary curve, and determine a target region in the scene to-be-recognized according to the contour map.

In one embodiment, generating the contour map corresponding to the scene image according to the specified boundary curve may include: obtaining pixel coordinate information of discrete points on the specified boundary curve; obtaining a plurality of contour lines according to the target contour weight and the pixel coordinate information of each discrete point; and rendering the regions corresponding to the plurality of contour lines to obtain the contour map.

In one embodiment, further, the target contour weight may be determined according to scene features of the scene to-be-recognized.

In one embodiment, obtaining the pixel coordinate information of discrete points on the specified boundary curve may include: discretizing the specified boundary curve to obtain the plurality of discrete points according to the pixel coordinate information of the specified contour points on the specified boundary curve; and obtaining the pixel coordinate information corresponding to the plurality of discrete points.

In one embodiment, obtaining the plurality of contour lines according to the target contour weight and the pixel coordinate information of each discrete point may include: obtaining the curve parameters of the specified boundary curve according to the pixel coordinate information of the plurality of discrete points; and obtaining the plurality of contour lines according to the target contour weight and the curve parameters by calculation.

In one embodiment, rendering the regions corresponding to the plurality of contour lines to obtain the contour map may include: determining a rendering mode corresponding to the target contour weight value; and performing rendering on a region corresponding to each contour line according to the height value of each contour line and the rendering mode to obtain the contour map.

In one embodiment, further, an adjusted contour weight may be obtained in response to received adjustment information for the target contour weight of the contour map; and the contour map may be re-rendered according to a rendering mode corresponding to the adjusted contour weight to obtain an adjusted contour map.

In one embodiment, the specified boundary curve of the scene image may be determined by generating the specified boundary curve matching the scene image according to the obtained specified contour points.

In one embodiment, the specified boundary curve of the scene image may be determined by: performing feature recognition on the scene image to obtain image features; determining a region to-be-recognized according to the image features; and determining the specified boundary curve of the region to-be-recognized.

In one embodiment, the target region in the scene to-be-recognized according to the contour map may be determined by: obtaining specified position information of a recognition frame corresponding to the object to be recognized; and determining a target region where the object to be recognized is located in the scene to-be-recognized according to pixel coordinate information of the specified position information on the contour map.

In one embodiment, further, distance information between the target object and a reference object in the target region may be determined according to the contour map in response to the target object being located in the target region; and warning information indicating that the target object invades the target region may be generated according to the distance information.

Each embodiment in this specification is described in a progressive manner, and each embodiment focuses on the difference from other embodiments. Same and similar parts of each embodiment may be referred to each other. As for the device disclosed in the embodiments, since it corresponds to the method disclosed in the embodiments, the description is relatively simple, and for relevant details, the reference may be made to the description of the method embodiments.

Units and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

The steps of the methods or algorithms described in connection with the embodiments disclosed herein may be directly implemented by hardware, software modules executed by a processor, or a combination of both. Software modules may be placed in a random access memory (RAM), an internal memory, a read-only memory (ROM), an electrically programmable ROM, an electrically erasable programmable ROM, a register, a hard disk, a removable disk, a CD-ROM, or any other storage medium.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A region recognition method, comprising:

obtaining a scene image of a scene to-be-recognized;

determining a specified boundary curve of the scene image, the specified boundary curve comprising a Bezier curve;

generating a contour map corresponding to the scene image according to the specified boundary curve, wherein the generating the contour map comprises discretizing the Bezier curve by setting a step size of a curve parameter t to obtain a plurality of discrete points, determining a normal vector of each of the plurality of discrete points, determining, through the normal vector of each discrete point, a height of the discrete point on the Bezier curve relative to a horizontal plane, calculating a plurality of contour lines according to the heights, and rendering a plurality of regions corresponding to the plurality of contour lines to obtain the contour map; and determining a target region in the scene according to the contour map.

2. The method according to claim 1, wherein generating the contour map corresponding to the scene image according to the specified boundary curve includes:

obtaining pixel coordinate information of the plurality of discrete points on the specified boundary curve, wherein the plurality of contour lines are obtained according to a target contour weight and the pixel coordinate information of each discrete point by calculation, the target contour weight represents coordinate difference information between the plurality of contour lines.

3. The method according to claim 2, further including determining the target contour weight according to scene features of the scene to-be-recognized, wherein:

obtaining the pixel coordinate information of the plurality of discrete points on the specified boundary curve includes: performing the discretization on the specified boundary curve further according to the pixel coordinate information of specified contour points on the specified boundary curve to determine the plurality of discrete points; and obtaining the pixel coordinate information of the plurality of discrete points; and obtaining the plurality of contour lines according to the target contour weight and the pixel coordinate information of each discrete point by calculation includes: obtaining curve parameters of the specified boundary curve according to the pixel coordinate information of the discrete points; and obtaining the plurality of contour lines by calculation according to the target contour line weight and the curve parameters.

4. The method according to claim 2, wherein rendering the regions corresponding to the plurality of contour lines to obtain the contour map includes:

determining a rendering mode corresponding to the target contour weight value, wherein a region corresponding each contour line is rendered according to a height value of each contour line of the plurality of contour lines and the rendering mode, to obtain the contour map.

5. The method according to claim 4, further including:

in response to receiving adjustment information for the target contour weight of the contour map, obtaining an adjusted contour weight; and according to a rendering mode corresponding to the adjusted contour weight, re-rendering the contour map to obtain an adjusted contour map.

6. The method according to claim 1, wherein determining the specified boundary curve of the scene image includes:

according to specified contour points, generating the specified boundary curve matching the scene image.

7. The method according to claim 1, wherein determining the specified boundary curve of the scene image includes:

performing feature recognition on the scene image to obtain image features;

determining a region to-be-recognized according to the image features; and determining a specified boundary curve of the region to-be-recognized.

8. The method according to claim 1, wherein determining the target region in the scene according to the contour map includes:

obtaining specified position information of a recognition frame corresponding to the object to be recognized; and determining the target region of the object to be recognized in the scene to-be-recognized according to pixel coordinate information of the specified position information on the contour map.

9. The method according to claim 1, further including:

in response to a target object being located in the target region, determining distance information between the target object and a reference object in the target region according to the contour map; and according to the distance information, generating warning information indicating that the target object invades the target region.

10. An electronic device, comprising:

one or more processors; and a memory coupled to the one or more processors and storing computer program instructions that, when being executed, cause the one or more processors to perform:

obtaining a scene image of a scene to-be-recognized;

determining a specified boundary curve of the scene image, the specified boundary curve comprising a Bezier curve;

generating a contour map corresponding to the scene image according to the specified boundary curve, wherein the generating the contour map comprises discretizing the Bezier curve by setting a step size of a curve parameter t to obtain a plurality of discrete points, determining a normal vector of each of the plurality of discrete points, determining, through the normal vector of each discrete point, a height of the discrete point on the Bezier curve relative to a horizontal plane, calculating a plurality of contour lines according to the heights, and rendering a plurality of regions corresponding to the plurality of contour lines to obtain the contour map; and determining a target region in the scene according to the contour map.

11. The electronic device according to claim 10, wherein the one or more processors are further configured to perform:

obtaining pixel coordinate information of the plurality of discrete points on the specified boundary curve, wherein the plurality of contour lines are obtained according to a target contour weight and the pixel coordinate information of each discrete point by calculation, the target contour weight represents coordinate difference information between the plurality of contour lines.

12. The electronic device according to claim 11, wherein the one or more processors are further configured to perform: determining the target contour weight according to scene features of the scene to-be-recognized, wherein:

the pixel coordinate information of the plurality of discrete points on the specified boundary curve is obtained by: performing the discretization on the specified boundary curve further according to the pixel coordinate information of specified contour points on the specified boundary curve to determine the plurality of discrete points; and obtaining the pixel coordinate information of the plurality of discrete points; and the plurality of contour lines according to the target contour weight and the pixel coordinate information of each discrete point by calculation is obtained by: obtaining curve parameters of the specified boundary curve according to the pixel coordinate information of the discrete points; and obtaining the plurality of contour lines by calculation according to the target contour line weight and the curve parameters.

13. The electronic device according to claim 11, wherein the one or more processors are further configured to perform:

determining a rendering mode corresponding to the target contour weight value, wherein a region corresponding to each contour line is rendered according to a height value of each contour line of the plurality of contour lines and the rendering mode to obtain the contour map.

14. The electronic device according to claim 13, wherein the one or more processors are further configured to perform:

in response to receiving adjustment information for the target contour weight of the contour map, obtaining an adjusted contour weight; and according to a rendering mode corresponding to the adjusted contour weight, re-rendering the contour map to obtain an adjusted contour map.

15. The electronic device according to claim 10, wherein the one or more processors are further configured to perform:

according to specified contour points, generating the specified boundary curve matching the scene image.

16. The electronic device according to claim 10, wherein the one or more processors are further configured to perform:

performing feature recognition on the scene image to obtain image features;

determining a region to-be-recognized according to the image features; and determining a specified boundary curve of the region to-be-recognized.

17. The electronic device according to claim 10, wherein the one or more processors are further configured to perform:

obtaining specified position information of a recognition frame corresponding to the object to be recognized; and determining the target region of the object to be recognized in the scene to-be-recognized according to pixel coordinate information of the specified position information on the contour map.

18. The electronic device according to claim 10, wherein the one or more processors are further configured to perform:

in response to a target object being located in the target region, determining distance information between the target object and a reference object in the target region according to the contour map; and according to the distance information, generating warning information indicating that the target object invades the target region.

19. A non-transitory computer readable storage medium containing computer program instructions that, when being executed, cause one or more processors to perform:

obtaining a scene image of a scene to-be-recognized;

determining a specified boundary curve of the scene image, the specified boundary curve comprising a Bezier curve;

generating a contour map corresponding to the scene image according to the specified boundary curve, wherein the generating the contour map comprises discretizing the Bezier curve by setting a step size of a curve parameter t to obtain a plurality of discrete points, determining a normal vector of each of the plurality of discrete points, determining, through the normal vector of each discrete point, a height of the discrete point on the Bezier curve relative to a horizontal plane, calculating a plurality of contour lines according to the heights, and rendering a plurality of regions corresponding to the plurality of contour lines to obtain the contour map; and determining a target region in the scene according to the contour map.

* * * * *